US012627086B2

(12) United States Patent
Yang et al.

(10) Patent No.: US 12,627,086 B2
(45) Date of Patent: May 12, 2026

(54) CONNECTOR ASSEMBLY WITH PARTITIONING ASSEMBLY FOR IMPROVED AIRFLOW

(71) Applicant: Molex, LLC, Lisle, IL (US)

(72) Inventors: Hui-Hsuan Yang, New Taipei (TW); Bhakteesh Arwankar, Uttara Kannada (IN); Weiming Chen, Pleasanton, CA (US); Saiyed Muhammad Hasan Ali, Conway, AR (US)

(73) Assignee: Molex, LLC, Lisle, IL (US)

( * ) Notice: Subject to any disclaimer, the term of this patent is extended or adjusted under 35 U.S.C. 154(b) by 316 days.

(21) Appl. No.: 18/492,839

(22) Filed: Oct. 24, 2023

(65) Prior Publication Data

US 2024/0136742 A1 Apr. 25, 2024
US 2024/0235076 A9 Jul. 11, 2024

(30) Foreign Application Priority Data

Oct. 24, 2022 (CN) ......................... 202222805856.9

(51) Int. Cl.

*H01R 13/648* (2006.01)
*H01R 12/71* (2011.01)
*H01R 13/652* (2006.01)
*H01R 13/6587* (2011.01)

(52) U.S. Cl.

CPC ......... *H01R 12/716* (2013.01); *H01R 13/652* (2013.01); *H01R 13/6587* (2013.01)

(58) Field of Classification Search

CPC ................ H01R 12/716; H01R 13/652; H01R 13/6587; H01R 13/6582; H01R 13/659; H01R 12/72
See application file for complete search history.

(56) References Cited

U.S. PATENT DOCUMENTS 7,641,515 B1 * 1/2010 Szczesny ........... H01R 13/6582 439/541.5
8,123,559 B2 * 2/2012 Brown ................. G02B 6/4261 361/818
9,728,919 B1 * 8/2017 Dunwoody ........ H01R 13/6582
(Continued)

FOREIGN PATENT DOCUMENTS

CN 210092418 U 2/2020
CN 111416239 A 7/2020

*Primary Examiner* — Abdullah A Riyami
*Assistant Examiner* — Nelson R. Burgos-Guntin

(57) ABSTRACT

A connector assembly includes a shielding cage, a partitioning assembly and a plurality of supporting members. The shielding cage has a plurality of walls and an internal space defined by the plurality of walls, the plurality of walls includes two side walls. The partitioning assembly is assembled to the two side walls of the shielding cage and partitions the internal space into two inserting chambers arranged up and down, the partitioning assembly includes two partitioning plates which are arranged up and down and two grounding elastic pieces which are respectively assembled to front ends of the two partitioning plates, the two partitioning plates are spaced apart from with each other by a preset interval to together constitute an air flow passageway and a front end opening positioned to a front end of the air flow passageway. The plurality of supporting members are supported between the two partitioning plates.

20 Claims, 8 Drawing Sheets

(56) References Cited

U.S. PATENT DOCUMENTS

| | | | | |
|---|---|---|---|---|
| 10,446,960 | B2 * | 10/2019 | Guy Ritter | H05K 7/20336 |
| 11,271,348 | B1 * | 3/2022 | Chen | H01R 12/724 |
| 2008/0299826 | A1 * | 12/2008 | Cheng | H05K 9/0058 29/874 |
| 2014/0030922 | A1 * | 1/2014 | Schmitt | H01R 13/6587 439/607.2 |
| 2017/0054234 | A1 * | 2/2017 | Kachlic | H01R 13/6583 |
| 2019/0326703 | A1 * | 10/2019 | Chen | H01R 12/53 |
| 2020/0091637 | A1 * | 3/2020 | Scholeno | G02B 6/42 |
| 2021/0226361 | A1 * | 7/2021 | Mason | H01R 13/6471 |
| 2022/0006217 | A1 * | 1/2022 | Huang | H05K 9/0058 |
| 2022/0021160 | A1 * | 1/2022 | Yang | H01R 13/6594 |

* cited by examiner

CONNECTOR ASSEMBLY WITH PARTITIONING ASSEMBLY FOR IMPROVED AIRFLOW

RELATED APPLICATIONS

The present application claims priority to Chinese Patent Application No. 202222805856.9 filed on Oct. 24, 2022, which is incorporated by reference in its entirety.

TECHNICAL FIELD

The present disclosure relates to a connector assembly, and particularly relates to a connector assembly which has a partitioning assembly.

BACKGROUND

Chinese patent document CN210092418U discloses a partitioning piece assembly, the partitioning piece assembly includes an upper partitioning piece and a lower partitioning piece which have a gap therebetween, an end of the upper partitioning piece away from a mating connector is provided with a first mounting zone, an end of the lower partitioning piece away from the mating connector is provided with a second mounting zone, the first mounting zone and the second mounting zone are mounted thereon with a second EMI grounding elastic piece which contacts the upper partitioning piece and the lower partitioning piece at the same time. Because the first mounting zone of the upper partitioning piece and the second mounting zone of the lower partitioning piece attach together, a front end opening between the upper partitioning piece and the lower partitioning piece is closed, heat dissipating air flow cannot enter into between the upper partitioning piece and the lower partitioning piece via the front end opening.

Moreover, this Chinese patent document discloses that, the upper partitioning piece is provided with a first contact piece which is fixedly connected with the lower partitioning piece by spot welding, the lower partitioning piece is provided with a second contact piece which is fixedly connected with the upper partitioning piece by spot welding, so connecting stability between the upper partitioning piece and the lower partitioning piece can be assured. However, it may be seen that, the first contact piece and the second contact piece are provided to a middle of the first contact piece and the second contact piece, and thus also block heat dissipating air flow to enter into between the upper partitioning piece and the lower partitioning piece.

SUMMARY

Therefore, an object of the present disclosure is to provide a connector assembly which can improve at least one deficiency of the prior art.

Accordingly, in some embodiments, a connector assembly of the present disclosure comprises a shielding cage, a partitioning assembly and a plurality of supporting members. The shielding cage has a plurality of walls and an internal space defined by the plurality of walls, the plurality of walls comprises two side walls. The partitioning assembly is assembled to the two side walls of the shielding cage and partitions the internal space into two inserting chambers arranged up and down, the partitioning assembly comprises two partitioning plates which are arranged up and down and two grounding elastic pieces which are respectively assembled to front ends of the two partitioning plates, the two partitioning plates are spaced apart from with each other by a preset interval to together constitute an air flow passageway and a front end opening positioned to a front end of the air flow passageway. The plurality of supporting members are supported between the two partitioning plates.

In some embodiments, at least one of the two partitioning plates has a folding portion which is provided to the front end of the corresponding partitioning plate and is locally positioned to the front end opening.

In some embodiments, the plurality of the supporting members are supported between the two partitioning plates at two sides of the two partitioning plates.

In some embodiments, the plurality of supporting members comprise a plurality of support protruding edges, the plurality of support protruding edges are integrally constructed to bend from side edges of at least one of the two partitioning plates toward side edge of the other of the two partitioning plates, and are supported between the side edges of the two partitioning plates.

In some embodiments, the plurality of supporting members comprises a plurality of supporting pieces, the plurality of supporting pieces are integrally constructed from the two side walls of the shielding cage and are formed to extend inwardly so as to be supported between the side edges of the two partitioning plates.

In some embodiments, each partitioning plate is formed with a plurality of air flow apertures which are communicated with the air flow passageway and each are in form of regular hexagon.

In some embodiments, the two partitioning plates each have the folding portion which is provided to the front end of the corresponding partitioning plate, and the folding portions of the two partitioning plates are staggered with each other in position.

In some embodiments, each grounding elastic piece has an elastic portion and a mounting plate which are respectively provided to two opposite surfaces of the front end of the corresponding partitioning plate, the elastic portion comprises a plurality of elastic finger portions and a catching piece which is positioned to a rear end of at least one of the plurality of elastic finger portions, each partitioning plate has a catching hole which engages with the catching piece of the corresponding grounding elastic piece.

In some embodiments, the catching piece has two butterfly wings which are respectively positioned to a left side and a right side of the catching piece, the catching piece passes through the catching hole and then folds back forwardly and the two butterfly wings of the catching pieces spread left and right, so that the catching piece hooks the catching hole.

In some embodiments, the plurality of walls of the shielding cage further comprises a top wall, the top wall has a pluggable module prevent reversed insertion protruding block which extends downwardly into the inserting chamber positioned to the up, the partitioning plate positioned to the down has a pluggable module prevent reversed insertion protruding block which extends downwardly into the inserting chamber positioned to the down.

In some embodiments, the two side walls of the shielding cage each have pluggable module limiting pieces which respectively extend into the two inserting chambers.

In the present disclosure, by that the two partitioning plates are spaced apart from with each other by the preset interval to together constitute the air flow passageway and the front end opening, a larger amount of heat dissipating air flow can enter into between the two partitioning plates, and the two grounding elastic pieces are respectively independently assembled to the two partitioning plates, assembling difficulty can be lowered. Additionally, by that at least one of the two partitioning plates has the folding portion which is locally positioned to the front end opening, the pluggable module can be prevented from wrongly inserting into the front end opening. Moreover, the plurality of support protruding edges and the plurality of supporting pieces are supported between the side edges of the two partitioning plates, the plurality of support protruding edges and the plurality of supporting pieces are capable of supporting the two partitioning plates and increasing strength of the two partitioning plates to prevent deformation, and do not block air flow to pass through the air flow passageway. Moreover, the plurality of air flow apertures which are formed to each of the two partitioning plates, are communicated with the air flow passageway and each are in form of regular hexagon can function for both communicating of air flow and shielding electromagnetic interference.

BRIEF DESCRIPTION OF THE DRAWINGS

Other features and effects of the present disclosure will be apparent from an embodiment with reference to the drawings, in which.

DETAILED DESCRIPTION

Figure 1:
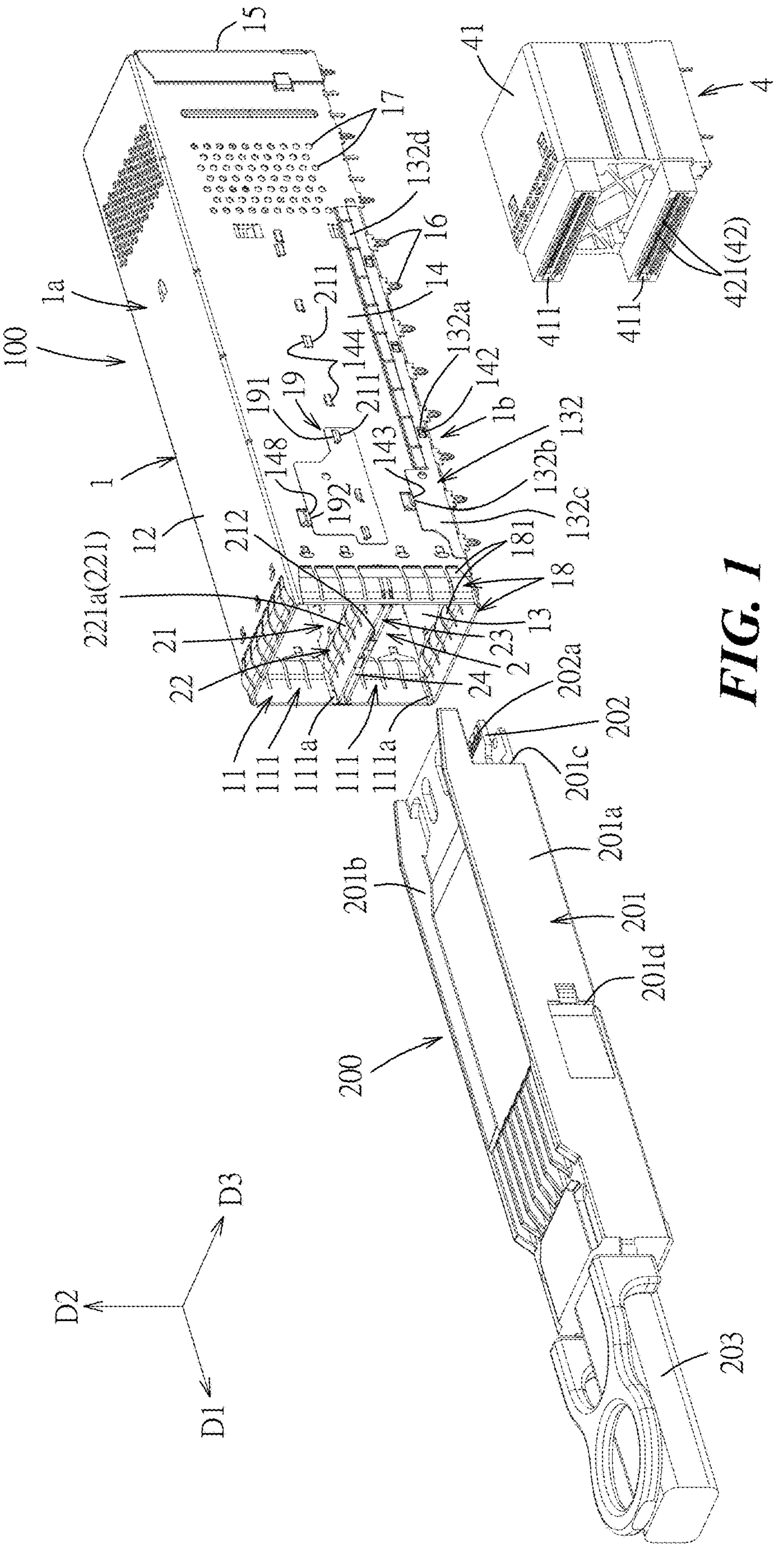
FIG. 1 is a perspective view of an embodiment of a connector assembly of the present disclosure and a pluggable module.
Figure 2:
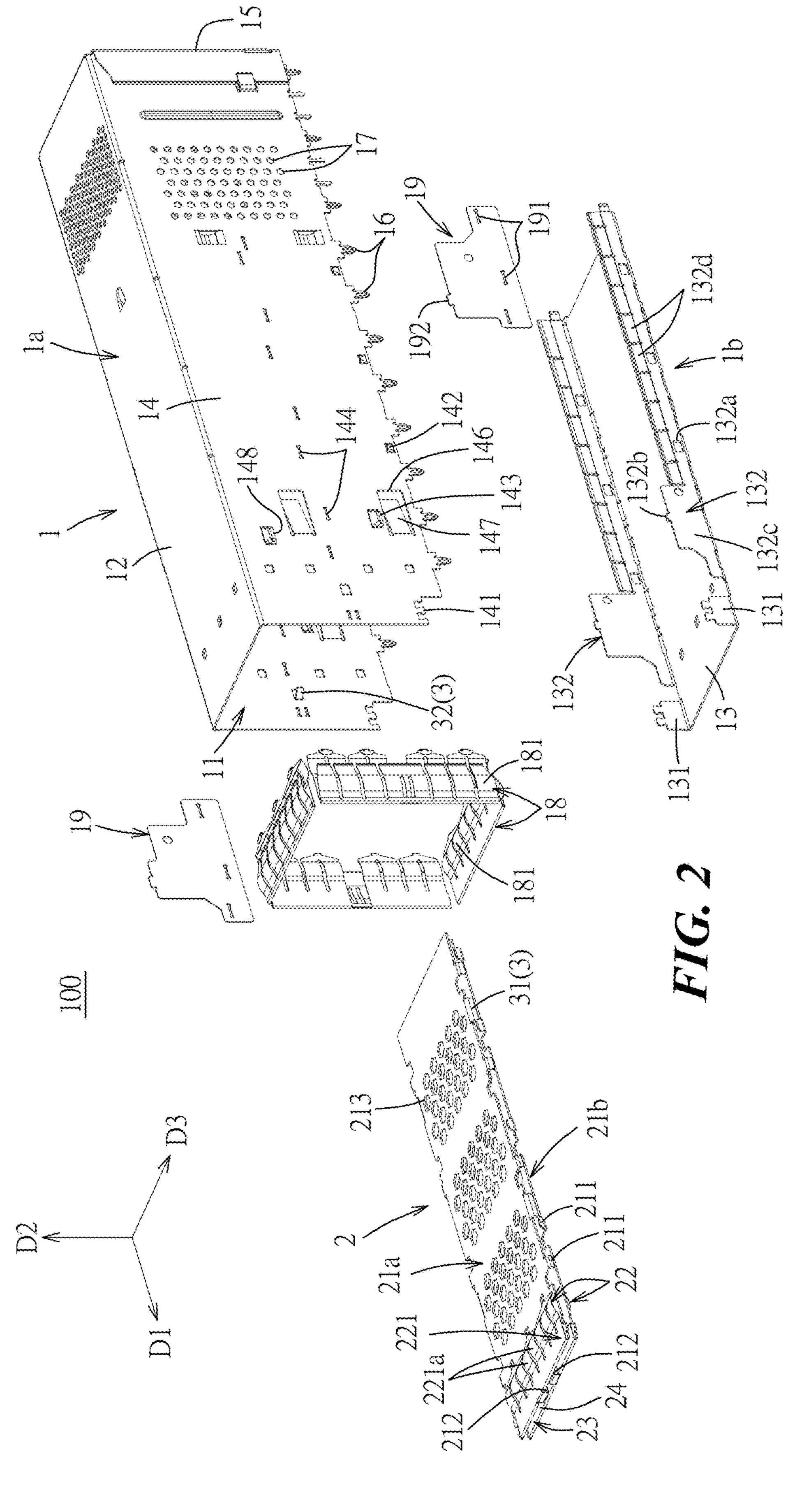
FIG. 2 is a perspective exploded view of the embodiment with a receptacle connector of the embodiment omitted.
Figure 3:
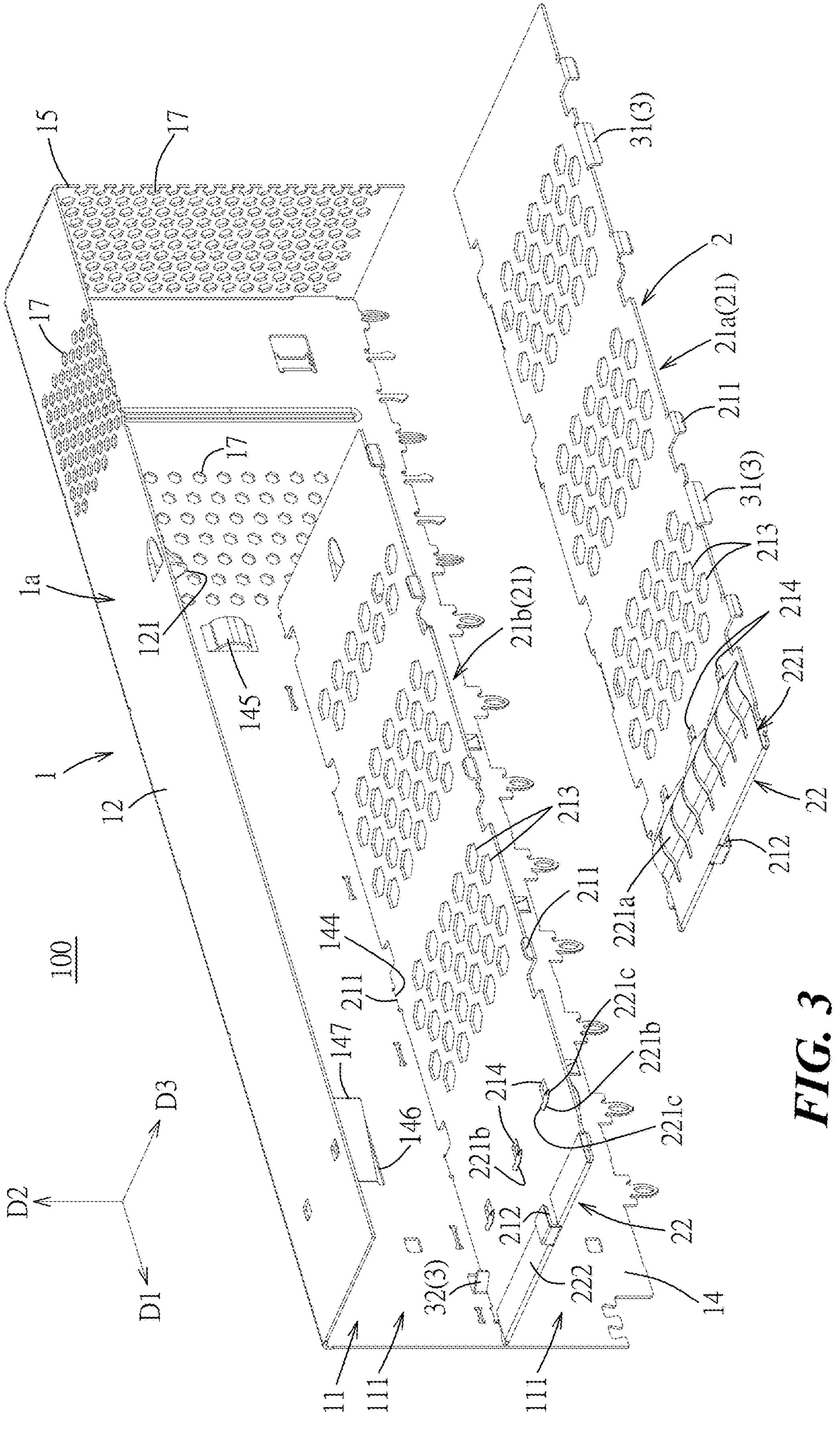
FIG. 3 is a partially cut-away perspective exploded view of a shielding cage and a partitioning assembly of the embodiment.
Figure 4:
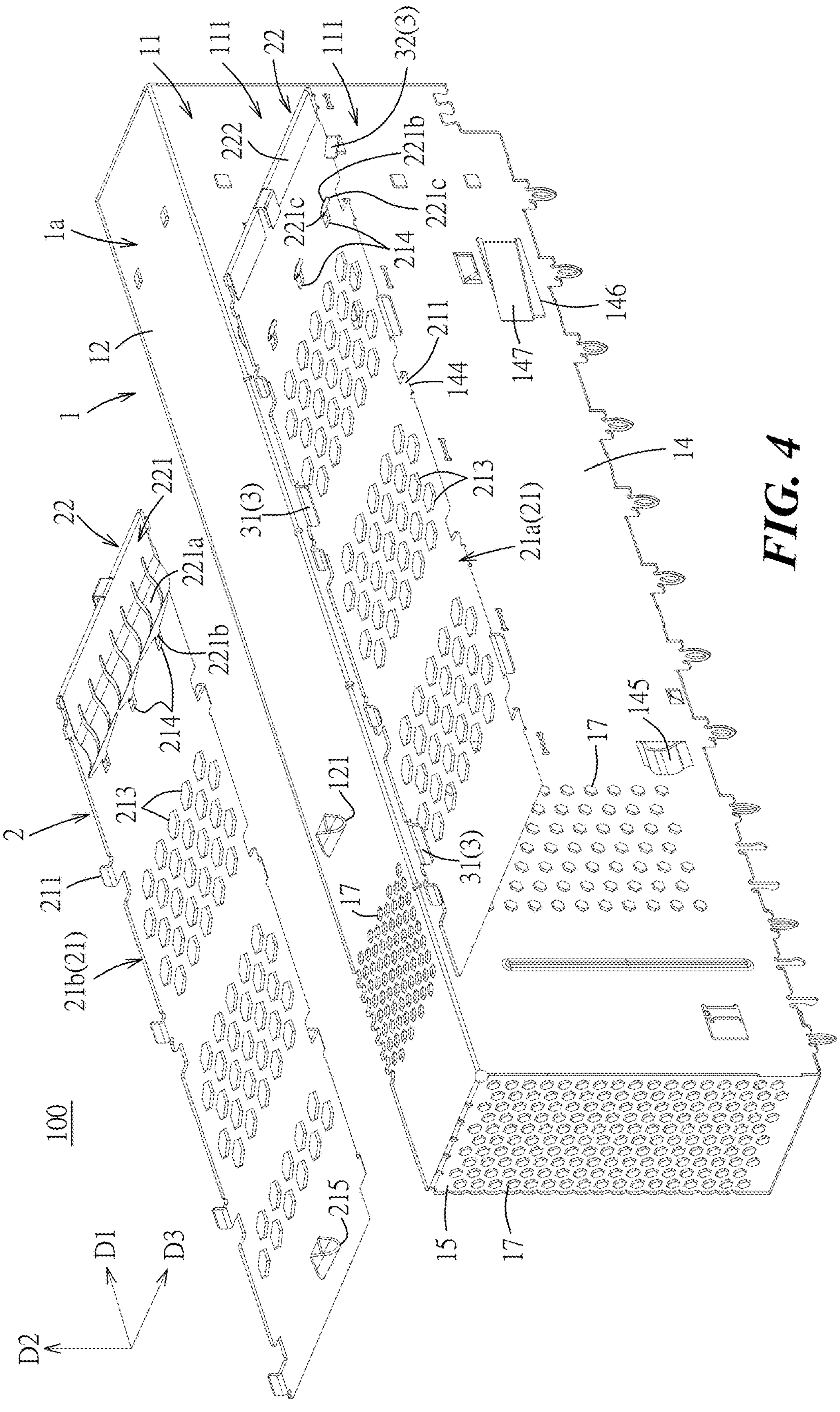
FIG. 4 is another partially cut-away perspective exploded view of the shielding cage and the partitioning assembly of the embodiment.

Referring to FIG. 1 to FIG. 4, an embodiment of a connector assembly 100 of the present disclosure is adapted to mate with a pluggable module 200. The pluggable module 200 includes a shell body 201, a mating board 202, and a cable 203. The shell body 201 includes an inserting portion 201*a*, the mating board 202 is provided to a tip of the inserting portion 201*a*, and the mating board 202 has a plurality of contact finger portions 202*a* thereon, the cable 203 is provided to the shell body 201 and is mechanically and electrically connected to the mating board 202. The connector assembly 100 includes a shielding cage 1, a partitioning assembly 2, a plurality of supporting members 3 and a receptacle connector 4.

The shielding cage 1 is constructed for example by processing, such as stamping, bending and the like, a conductive metal plate, and is used to guide the pluggable module 200 and generate a function to shield electromagnetic interference. The shielding cage 1 extends along a front-rear direction D1 (a direction to which an arrow points is front, and an opposite direction is rear) and has a plurality of walls and an internal space 11 defined by the plurality of walls. The plurality of walls includes a top wall 12, a bottom wall 13 which is spaced apart from and faces the top wall 12 along an up-down direction D (a direction to which an arrow points is up, and an opposite direction is down), two side walls 14 which are spaced apart from each other and face each other along a left-right direction D3 (a direction to which an arrow points is right, and an opposite direction is left) and are connected between two sides of the top wall 12 and two sides of the bottom wall 13, and a rear wall 15 which is connected to a rear edge of the top wall 12 and rear edges of the two side walls 14. The shielding cage 1 further has a plurality of pressing fit legs 16 which are formed to bottom edges of the two side walls 14 and a plurality of heat dissipating apertures 17 which are formed to a rear segment of the top wall 12 and rear segments of the two side walls 14 and the rear wall 15 and each are in form of regular hexagon. The plurality of pressing fit legs 16 are used to pressed fit into pressing fit holes (not shown) of a circuit board (not shown), so that the shielding cage 1 is fixed to the circuit board and may be electrically connected to a grounding circuitry on the circuit board.

In the present embodiment, the shielding cage 1 includes an upper shell 1*a* and a lower shell 1*b* which are assembled with each other and define the internal space 11. The upper shell 1*a* has the top wall 12, the two side walls 14 and the rear wall 15 which are integrally connected with each other, the lower shell 1*b* has the bottom wall 13, and the lower shell 1*b* is provided to the two side walls 14 of the upper shell 1*a* by assembling. Each side wall 14 of the upper shell 1*a* is formed with a dovetail recess 141 at the bottom edge of the side wall 14 close to a front end of the side wall 14, and each side wall 14 is formed outwardly with a plurality of latching blocks 142 and an inserting hole 143 which is opened downwardly. The bottom wall 13 of the lower shell 1*b* is integrally formed upwardly with two dovetail protrusions 131 which correspondingly cooperate with the dovetail recesses 141 of the two side walls 14 respectively and two side plates 132 which are correspondingly assembled to outer sides of the two side walls 14. Each side plate 132 is formed with a plurality of latching holes 132*a* which latch with the plurality of latching block 142 of the corresponding side wall 14 and an insertion portion 132*b* which upwardly inserts into the inserting hole 143 of the corresponding side wall 14, so that the bottom wall 13 of the lower shell 1*b* is capable of being assembled to and engaged with the two side walls 14 of the upper shell 1*a*. The two side plates 132 of the bottom wall 13 each are provided with a plurality of elastic pieces 132*d*, the elastic pieces 132*d* of the two side plates 132 of the bottom wall 13 are used to contact and clamp outer wall surfaces of the two side walls 14 of the upper shell 1*a*.

Figure 5:
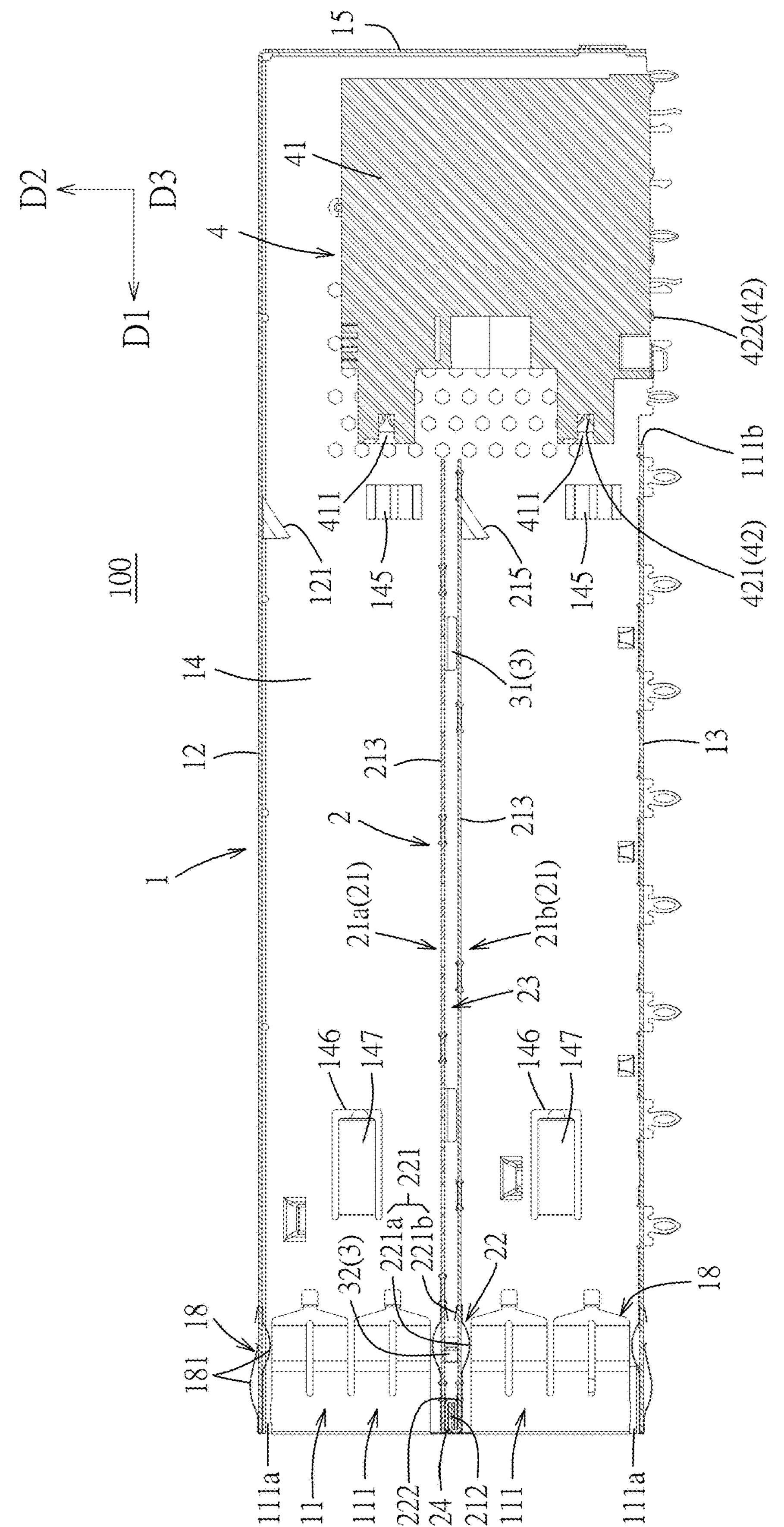
FIG. 5 is a cross sectional view of the embodiment of the connector assembly of the present disclosure.

Referring to FIG. 1 to FIG. 5, the partitioning assembly 2 is assembled to the two side walls 14 of the shielding cage 1, and partitions the internal space 11 into two inserting chambers 111 which are arranged up and down and are communicated with each other at rear segments thereof. The partitioning assembly 2 includes two partitioning plates 21 which are arranged up and down and are divided into an upper partitioning plate 21*a* and a lower partitioning plate 21*b* and two grounding elastic pieces 22 which are respectively assembled to front ends of the two partitioning plates 21. Each partitioning plate 21 has a plurality of fixing bendable pieces 211 which are formed to a left side edge and a right side edge of the partitioning plate 21. Each side wall 14 of the shielding cage 1 has a plurality of fixing through holes 144 which correspondingly cooperate with the fixing bendable pieces 211 of the two partitioning plates 21. The fixing bendable pieces 211 of the two partitioning plates 21 correspondingly pass through the fixing through holes 144 of the two side walls 14 of the shielding cage 1 and then are bent, so that the partitioning assembly 2 is assembled to the two side walls 14 of the shielding cage 1. The inserting chamber 111 positioned to the up is defined together by the top wall 12, the two side walls 14 and the upper partitioning plate 21*a* of the partitioning assembly 2, the inserting chamber 111 positioned to the down is defined together by the two side walls 14, the bottom wall 13 and the lower partitioning plate 21*b* of the partitioning assembly 2. Each inserting chamber 111 has a front end port 111*a* which is positioned to a front end of the inserting chamber 111 and allows the pluggable module 200 to insert therein, the inserting chamber 111 positioned to the down further has a bottom opening 111*b* which is defined together by the bottom wall 13, the two side walls 14 and the rear wall 15.

Figure 6:
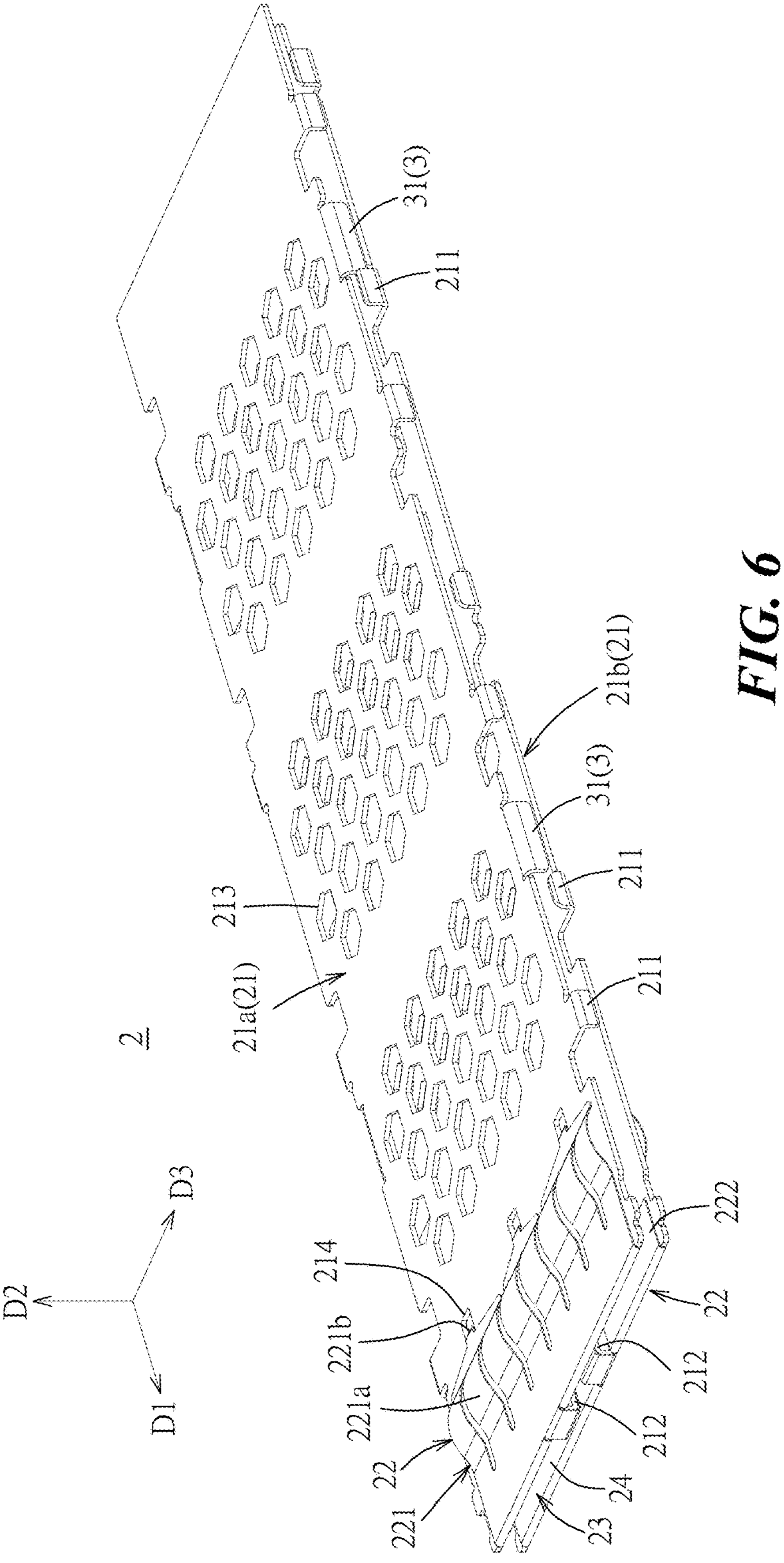
FIG. 6 is a perspective view of the partitioning assembly of the embodiment.
Figure 7:
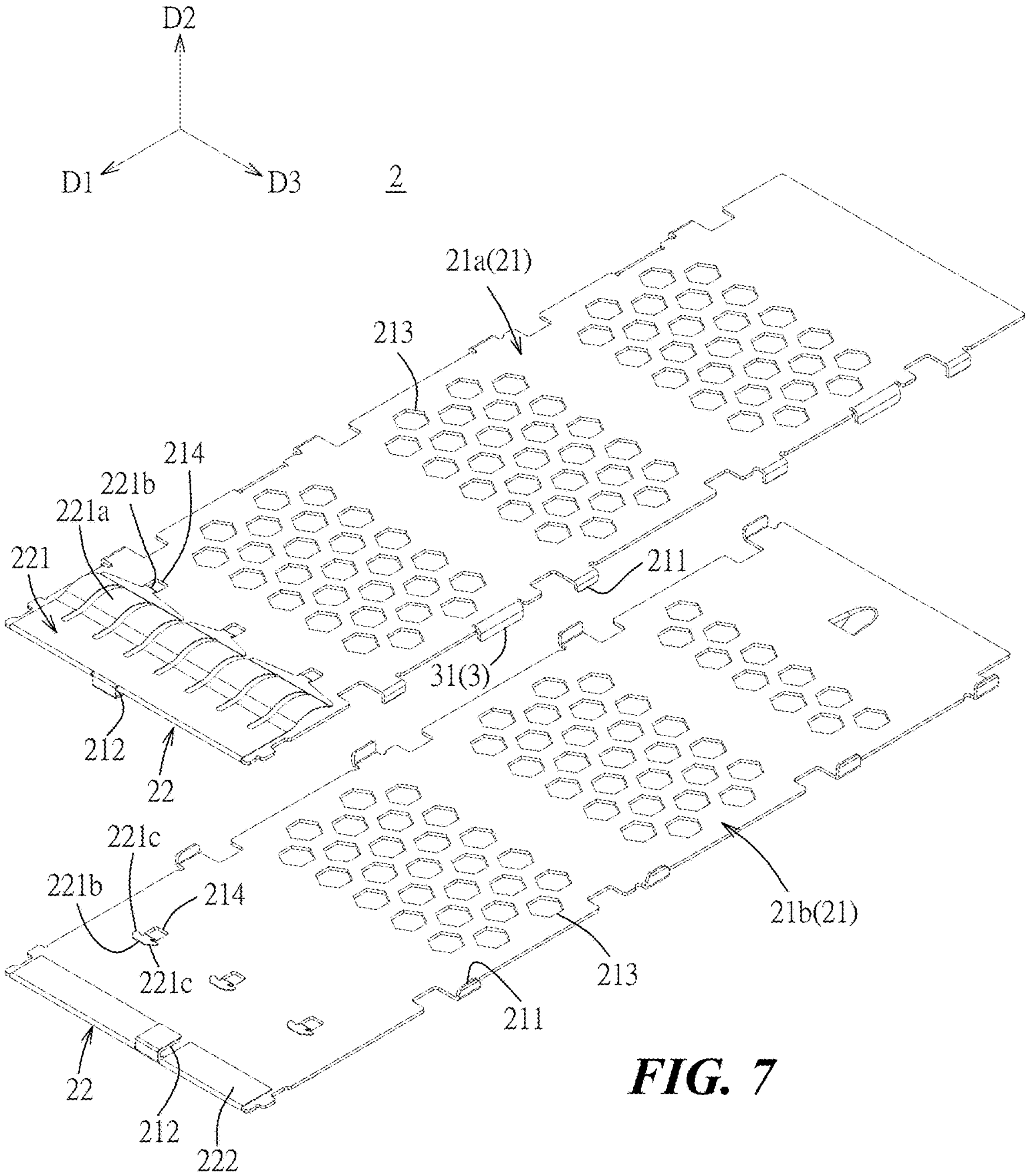
FIG. 7 is a perspective exploded view of the partitioning assembly of the embodiment.

Referring to FIG. 1 and FIG. 5 to FIG. 7, the two partitioning plates 21 are spaced apart from with each other by a preset interval to together constitute an air flow passageway 23 and a front end opening 24 positioned to a front end of the air flow passageway 23. By that the two partitioning plates 21 are spaced apart from with each other by the preset interval to together constitute the air flow passageway 23 and the front end opening 24, a larger amount of heat dissipating air flow can enter into between the two partitioning plates 21. The two partitioning plates 21 each have a folding portion 212 which is provided to a front end of the partitioning plate 21 and is locally positioned to the front end opening 24 and a plurality of air flow apertures 213 which are communicated with the air flow passageway 23 and each are in form of regular hexagon. In the present embodiment, the folding portions 212 of the two partitioning plates 21 are staggered with each other in position along the left-right direction D3. It is noted that, in other implementing manners, the two partitioning plates 21 also may be that only at least one of the two partitioning plates 21 has the folding portion 212 which is provided to the front end of the corresponding partitioning plate 21 and is locally positioned to the front end opening 24, a width of the folding portion 212 in the left-right direction D3 only occupies a few of a space of the front end opening 24, so a large amount of heat dissipating air flow still can be allowed to pass through the front end opening 24. By the folding portions 212 of the two partitioning plates 21, the pluggable module 200 can be prevented from wrongly inserting into the front end opening 24 between the two partitioning plates 21. Additionally, the plurality of air flow apertures 213 which are formed to each of the two partitioning plates 21, are communicated with the air flow passageway 23 and each are in form of regular hexagon can function for both communicating of air flow and shielding electromagnetic interference.

Referring to FIG. 3 and FIG. 5 to FIG. 7, the plurality of supporting members 3 are supported between the two partitioning plates 21 at two sides of the two partitioning plates 21. The plurality of supporting members 3 includes a plurality of support protruding edges 31 and a plurality of supporting pieces 32. The plurality of support protruding edges 31 are integrally constructed to bend from side edges of the upper partitioning plate 21*a* of the two partitioning plates 21 toward side edges of the lower partitioning plate 21*b*, and are supported between the side edges of the two partitioning plates 21. It is noted that, in other implementing manners, the plurality of support protruding edges 31 also may be constructed to bend from the side edges of the lower partitioning plate 21*b* of the two partitioning plates 21 toward the side edges of the upper partitioning plate 21*a*, or may be formed respectively from the side edges of the two partitioning plates 21. That is to say, the plurality of support protruding edges 31 are formed to bend from the side edges of at least one of the two partitioning plates 21 toward the other of the two partitioning plates 21. Plate surfaces of the plurality of support protruding edges 31 extend along the front-rear direction D1, and thus do not block the air flow in the air flow passageway 23. The plurality of supporting pieces 32 are integrally constructed respectively from front segments of the two side walls 14 of the shielding cage 1 and are formed to extend inwardly so as to be supported between the side edges of the two partitioning plates 21. The plurality of supporting pieces 32 extend into between the side edges of the two partitioning plates 21 along the left-right direction D3 with shorter lengths thereof, and thus do not block the air flow in the air flow passageway 23. By that the plurality of support protruding edges 31 and the plurality of supporting pieces 32 are supported between the side edges of the two partitioning plates 21, the plurality of support protruding edges 31 and the plurality of supporting pieces 32 are capable of supporting the two partitioning plates 21 and increasing strength of the two partitioning plates 21 to prevent deformation of the two partitioning plates 21, and do not block the air flow to pass through the air flow passageway 23.

Figure 8:
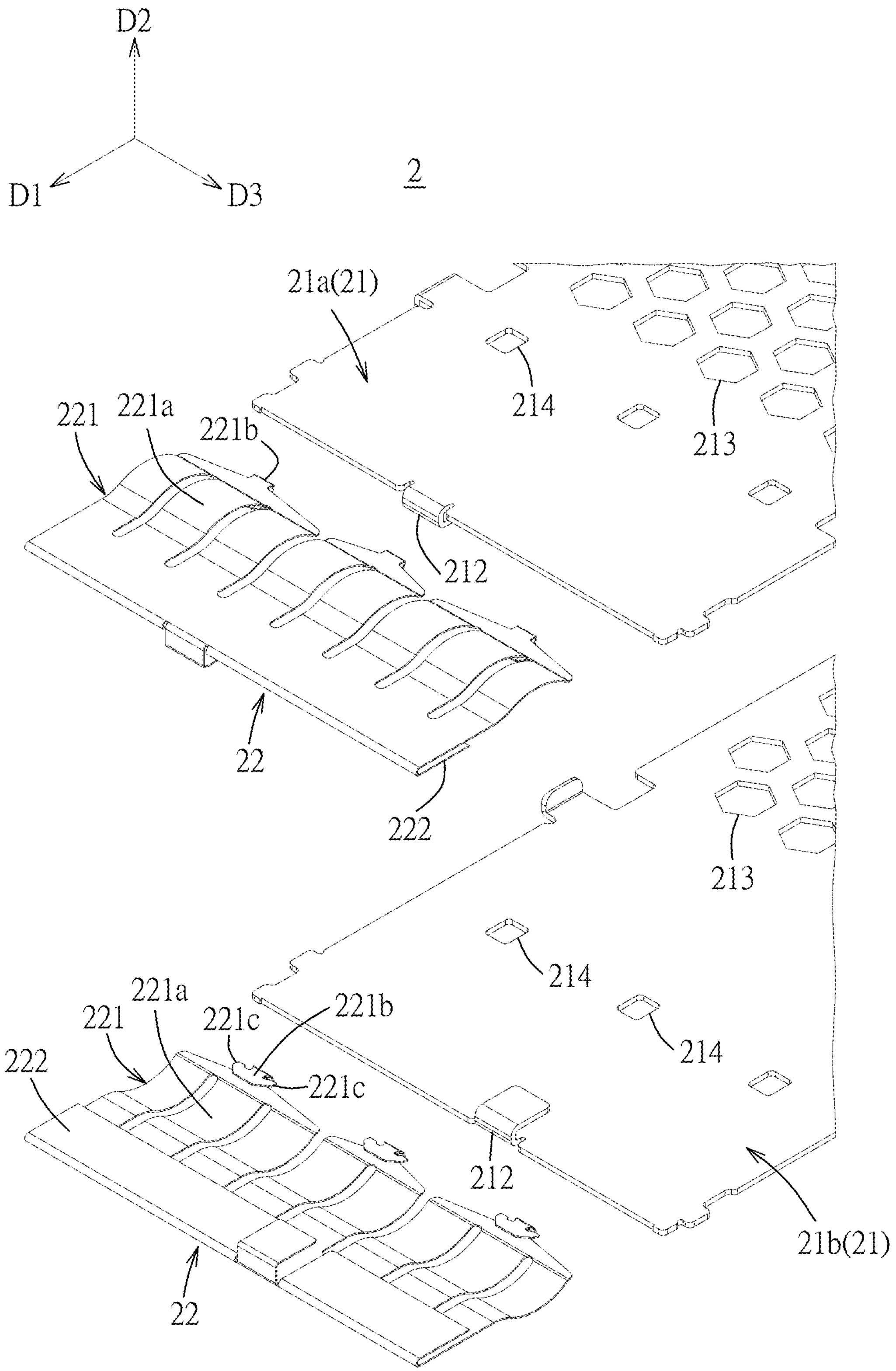
FIG. 8 is a further exploded perspective view of the partitioning assembly of the embodiment with only parts of front segments of two partitioning plates of the partitioning assembly shown.

Referring to FIG. 1, FIG. 5, FIG. 7 and FIG. 8, each grounding elastic piece 22 has an elastic portion 221 and a mounting plate 222 which are respectively provided to two opposite surfaces of the front end of the corresponding partitioning plate 21, the elastic portions 221 of the two grounding elastic pieces 22 respectively rearwardly extend into the two inserting chambers 111. The elastic portion 221 of each grounding elastic piece 22 includes a plurality of elastic finger portions 221*a* and multiple catching pieces 221*b* which are positioned to rear ends of the plurality of elastic finger portions 221*a*, each partitioning plate 21 has multiple catching holes 214 which engage with the multiple catching pieces 221*b* of the corresponding grounding elastic piece 22. Each catching piece 221*b* has two butterfly wings 221*c* which are respectively positioned to a left side and a right side of the catching piece 221*b*, the catching piece 221*b* passes through the corresponding catching hole 214 and then folds back forwardly and the two butterfly wings 221*c* of the catching piece 221*b* spread left and right, so that the catching piece 221*b* hooks the catching hole 214. The mounting plate 222 of each grounding elastic piece 22 extends into between the two partitioning plates 21 and covers the corresponding partitioning plate 21 and the folding portion 212 of the corresponding partitioning plate 21. Because the two grounding elastic pieces 22 are respectively independently assembled to the two partitioning plates 21, assembling difficulty in assembling can be lowered.

The receptacle connector 4 is provided on the circuit board, and is provided to the rear segments of the two inserting chambers 111 of the shielding cage 1 via the bottom opening 111*b*. The receptacle connector 4 has a housing 41 which is insulative and a plurality of terminals 42 which are provided to the housing 41. The housing 41 has two mating slots 411 which are toward the front and respectively correspond to the two inserting chambers 111, each terminal 42 has a contact portion 421 which is positioned in the corresponding mating slot 411 and a tail portion 422 which extends downwardly out of a bottom portion of the housing 41, the tail portions 422 of the plurality of terminals 42 are respectively used to be assembled to the circuit board, so that the receptacle connector 4 is fixed to the circuit board and the plurality of terminals 42 of the receptacle connector 4 are mechanically and electrically connected to the circuit board.

After the pluggable module 200 enters into the corresponding inserting chamber 111 of the shielding cage 1 via the front end port 111*a* of any one of the two inserting chambers 111, the mating board 202 at the tip of the inserting portion 201*a* of the pluggable module 200 can insert into the corresponding mating slot 411 of the receptacle connector 4, so that the plurality of contact finger portions 202 of the mating board 202 contact the contact portions 421 of the terminals 42 in the corresponding mating slot 411 to make the pluggable module 200 and the receptacle connector 4 of the connector assembly 100 mated with each other.

Moreover, a front segment of the shielding cage 1 adjacent to the front end ports 111*a* of the two inserting chambers 111 may be provided to a mounting hole of a casing (not shown), the shielding cage 1 is further provided with a plurality of grounding members 18 which are adjacent to the two front end ports 111*a*. The plurality of grounding members 18 have a plurality of elastic fingers 181 which extend rearwardly from the front end ports 111*a* and are distributed to an outer side and an inner side of the front end ports 111*a*, the elastic fingers 181 of the plurality of elastic fingers 181 which is positioned to the outer side of the front end ports 111*a* is used to contact a part of a circumferential edge of the mounting hole of the casing, the elastic fingers 181 of the plurality of elastic fingers 181 which is positioned to the inner side of the front end ports 111*a* is used to contact the shell body 201 of the pluggable module 200. And the elastic finger portions 221*a* of the two grounding elastic pieces 22 of the partitioning assembly 2 are used to contact the shell body 201 of the pluggable module 200.

Referring to FIG. 1 to FIG. 2 and FIG. 4 to FIG. 5, moreover, the top wall 12 has a pluggable module prevent reversed insertion protruding block 121 which extends downwardly into the inserting chamber 111 positioned to the up, the lower partitioning plate 21*b* positioned to the down has a pluggable module prevent reversed insertion protruding block 215 which extends downwardly into the inserting chamber 111 positioned to the down. The pluggable module prevent reversed insertion protruding block 121, 215 is used to be received in an alignment recess 201*b* at a top surface of the shell body 201 of the pluggable module 200, so as to prevent the pluggable module 200 from upside down inserting into each inserting chamber 111. The two side walls 14 of the shielding cage 1 each have two pluggable module limiting pieces 145 which respectively extend into the two inserting chambers 111, the pluggable module limiting piece 145 is used to limit a limited surface 201*c*, which is toward the front, of the shell body 201 of the pluggable module 200, so as to limit an inserting depth that the pluggable module 200 inserts into each inserting chamber 111.

Moreover, it is noted that, in the present embodiment, each side wall 14 of the shielding cage 1 is further formed with two side openings 146 which respectively correspond to the two inserting chambers 111 and two locking pieces 147 which each obliquely extend inwardly and rearwardly from a front side edge of the corresponding side opening 146, the two locking pieces 147 are used to latch into two locking recesses 201*d* at two side surfaces of the inserting portion 201*a* of the pluggable module 200, so as to generate a locking effect on the pluggable module 200 which inserts into the corresponding inserting chamber 111. And, the side opening 146 positioned to the down is sheltered by a front stopping portion 132*c* at a front segment of the corresponding side plate 132 of the bottom wall 13, the side opening 146 positioned to the up is sheltered by a sheltering piece 19 which is provided to the corresponding side wall 14, so that the influence of the side opening 146 on the electromagnetic interference can be lowered. The sheltering piece 19 has a fixing through hole 191 which allows the corresponding fixing bendable piece 211 of the two partitioning plates 21 of the partitioning assembly 2 to pass therethrough and to be bent and fixed and a fixing insertion piece 192 which extends upwardly and inserts into a corresponding fixing insertion hole 148 of the corresponding side wall 14.

In conclusion, in the present disclosure, by that the two partitioning plates 21 are spaced apart from with each other by the preset interval to together constitute the air flow passageway 23 and the front end opening 24, a larger amount of heat dissipating air flow can enter into between the two partitioning plates 21, and the two grounding elastic pieces 22 are respectively independently assembled to the two partitioning plates 21, assembling difficulty can be lowered. Additionally, by that at least one of the two partitioning plates 21 has the folding portion 212 which is locally positioned to the front end opening 24, the pluggable module 200 can be prevented from wrongly inserting into the front end opening 24. Moreover, the plurality of support protruding edges 31 and the plurality of supporting pieces 32 are supported between the side edges of the two partitioning plates 21, the plurality of support protruding edges 31 and the plurality of supporting pieces 32 are capable of supporting the two partitioning plates 21 and increasing strength of the two partitioning plates 21 to prevent deformation, and do not block air flow to pass through the air flow passageway 23. Moreover, the plurality of air flow apertures 213 which are formed to each of the two partitioning plates 21, are communicated with the air flow passageway 23 and each are in form of regular hexagon can function for both communicating of air flow and shielding electromagnetic interference.

However, what is described above is just the embodiment of the present disclosure, which is not intended to limit the scope implementing the present disclosure, any simple equivalent variations and modifications made according to the claims and the specification of the present disclosure will also be fallen within the scope of the present disclosure.

What is claimed is:

1. A connector assembly, comprising:

a shielding cage which has a plurality of walls and an internal space defined by the plurality of walls, the plurality of walls comprising two side walls;

a partitioning assembly which is assembled to the two side walls of the shielding cage and partitions the internal space into two inserting chambers arranged up and down, the partitioning assembly comprising two partitioning plates which are arranged vertically and two grounding elastic pieces which are respectively assembled to front ends of the two partitioning plates, the two partitioning plates being spaced apart from each other by a preset interval to together constitute an air flow passageway and a front end opening positioned to a front end of the air flow passageway, and the two partitioning plates each having a plurality of air flow apertures communicated with the air flow passageway; and a plurality of supporting members which are supported between the two partitioning plates.

2. The connector assembly of claim 1, wherein at least one of the two partitioning plates has a folding portion which is provided to the front end of the corresponding partitioning plate and is locally positioned to the front end opening, the two portioning plates being separated from one another by the preset interval based on a height of the folding portion.

3. The connector assembly of claim 1, wherein the plurality of the supporting members are supported between the two partitioning plates at two sides of the two partitioning plates.

4. The connector assembly of claim 3, wherein the plurality of supporting members comprise a plurality of support protruding edges, the plurality of support protruding edges are integrally constructed to bend from side edges of at least one of the two partitioning plates toward side edges of the other of the two partitioning plates, and are supported between the side edges of the two partitioning plates.

5. The connector assembly of claim 3, wherein the plurality of supporting members comprises a plurality of supporting pieces, the plurality of supporting pieces are integrally constructed from the two side walls of the shielding cage and are formed to extend inwardly so as to be supported between the side edges of the two partitioning plates.

6. The connector assembly of claim 1, wherein the plurality of air flow apertures communicated with the air flow passageway are in a shape of a regular hexagon.

7. The connector assembly of claim 2, wherein the two partitioning plates each have the folding portion which is provided to the front end of the corresponding partitioning plate, and the folding portions of the two partitioning plates are staggered with each other in position.

8. The connector assembly of claim 1, wherein:

each grounding elastic piece has an elastic portion and a mounting plate which are respectively provided to two opposite surfaces of the front end of the corresponding partitioning plate, the elastic portion comprises a plurality of elastic finger portions and a catching piece which is positioned to a rear end of at least one of the plurality of elastic finger portions, and each partitioning plate has a catching hole which engages with the catching piece of the corresponding grounding elastic piece.

9. The connector assembly of claim 8, wherein;

the catching piece has two butterfly wings which are respectively positioned to a left side and a right side of the catching piece, and the catching piece passes through the catching hole and then folds back forwardly and the two butterfly wings of the catching pieces spread left and right, so that the catching piece hooks the catching hole.

10. The connector assembly of claim 1, wherein:

the plurality of walls of the shielding cage further comprises a top wall, the top wall has an insertion protruding block which extends downwardly into an upper inserting chamber, and a lower partitioning plate of the two partitioning plates has an insertion protruding block which extends downwardly into a lower inserting chamber.

11. The connector assembly of claim 1, wherein the two side walls of the shielding cage each have pluggable module limiting pieces which respectively extend into the two inserting chambers.

12. A connector assembly, comprising:

a shielding cage extending in a front-rear direction and having a top wall, a bottom wall, two side walls, and an internal space defined by the walls;

a partitioning assembly mounted to the two side walls of the shielding cage and dividing the internal space into an upper inserting chamber and a lower inserting chamber, the partitioning assembly comprising an upper partitioning plate and a lower partitioning plate arranged vertically and spaced apart from one another by a predetermined interval to define an air flow passageway extending in the front-rear direction and having a front end opening;

wherein at least one of the upper partitioning plate and the lower partitioning plate includes a folding portion formed at a front end thereof and partially covering the front end opening, and wherein each of the upper partitioning plate and the lower partitioning plate is formed with a plurality of air flow apertures communicated with the air flow passageway; and two grounding elastic pieces mounted to front ends of the upper partitioning plate and the lower partitioning plate, respectively;

a plurality of supporting members positioned on opposing lateral sides of the partitioning assembly and supported between side edges of the upper partitioning plate and the lower partitioning plate, the supporting members being configured to maintain the predetermined interval between the upper and lower partitioning plates.

13. The connector assembly of claim 12, wherein the partitioning assembly further comprises a first folding portion extending vertically downward from a front end of the upper partitioning plate, and a second folding portion extending vertically upward from a front end of the lower partitioning plate.

14. The connector assembly of claim 13, wherein the first folding portion and the second folding portion are offset from one another in a left-right direction.

15. The connector assembly of claim 12, wherein the two grounding elastic pieces are integrally mounted to the upper partitioning plate and the lower partitioning plate, respectively.

16. The connector assembly of claim 12, wherein each grounding elastic piece includes an elastic portion having a plurality of elastic finger portions and at least one catching piece engaged with a corresponding catching hole formed in the respective partitioning plate.

17. The connector assembly of claim 12, wherein the supporting members include a plurality of support protruding edges integrally formed from side edges of at least one of the upper partitioning plate and the lower partitioning plate and extending toward the other partitioning plate.

18. The connector assembly of claim 12, wherein the supporting members include a plurality of supporting pieces integrally formed from the two side walls of the shielding cage and extending inwardly between side edges of the upper partitioning plate and the lower partitioning plate.

19. The connector assembly of claim 12, wherein the plurality of air flow apertures formed in each of the upper partitioning plate and the lower partitioning plate are polygonal.

20. The connector assembly of claim 12, wherein:

the plurality of walls of the shielding cage further comprises a top wall, the top wall has an insertion protruding block which extends downwardly into an upper inserting chamber, and a lower partitioning plate of the two partitioning plates has an insertion protruding block which extends downwardly into a lower inserting chamber.

* * * * *